(12) United States Patent
Ma et al.

(10) Patent No.: US 12,035,168 B2
(45) Date of Patent: Jul. 9, 2024

(54) METHOD AND DEVICE FOR CONFIGURING REDUNDANT PROTOCOL DATA UNIT SESSION

(71) Applicant: ZTE CORPORATION, Guangdong (CN)

(72) Inventors: Wei Ma, Guangdong (CN); Hongjun Liu, Guangdong (CN); Wu Wen, Guangdong (CN)

(73) Assignee: ZTE CORPORATION, Guangdong (CN)

(*) Notice: Subject to any disclaimer, the term of this patent is extended or adjusted under 35 U.S.C. 154(b) by 386 days.

(21) Appl. No.: 17/606,560

(22) PCT Filed: Mar. 31, 2020

(86) PCT No.: PCT/CN2020/082591
§ 371 (c)(1),
(2) Date: Oct. 26, 2021

(87) PCT Pub. No.: WO2020/216023
PCT Pub. Date: Oct. 29, 2020

(65) Prior Publication Data
US 2022/0232413 A1  Jul. 21, 2022

(30) Foreign Application Priority Data
Apr. 26, 2019 (CN) .......................... 201910346241.4

(51) Int. Cl.
*H04W 28/02* (2009.01)
*H04W 28/24* (2009.01)

(52) U.S. Cl.
CPC ... *H04W 28/0273* (2013.01); *H04W 28/0268* (2013.01); *H04W 28/24* (2013.01)

(58) Field of Classification Search
CPC ............. H04W 28/24; H04W 28/0268; H04W 28/0273
(Continued)

(56) References Cited

U.S. PATENT DOCUMENTS

2020/0313794 A1* 10/2020 Chandramouli ...... H04W 76/15
2021/0211233 A1* 7/2021 Zhang ..................... H04L 45/28

FOREIGN PATENT DOCUMENTS

CN          109076628 A          12/2018
CN          109392023 A          2/2019

OTHER PUBLICATIONS

Qualcomm Incorporated, "Analysis of URLLC solutions using DC", 3GPP Draft, Nov. 20, 2018.
(Continued)

*Primary Examiner* — Peter G Solinsky
(74) *Attorney, Agent, or Firm* — Li & Cai Intellectual Property (USA) Office

(57) ABSTRACT

The invention relates to the field of communication, and provides a method and a device for configuring a redundant PDU session. The method includes: obtaining first redundancy indication information for establishing or modifying the PDU session and/or a QoS flow; and configuring the redundant PDU session and/or a redundant QoS flow on a corresponding RAN node, according to the first redundancy indication information. In the present invention, establishing and modifying of a user plane multi-connectivity can be realized by obtaining the redundancy indication information for establishing or modifying the PDU session and/or the QoS flow, and configuring the redundant PDU session and/or the QoS flow to the corresponding RAN node according to the redundancy indication information.

18 Claims, 6 Drawing Sheets

(58) Field of Classification Search
USPC .......................................................... 370/329
See application file for complete search history.

(56) References Cited

OTHER PUBLICATIONS

"3rd Generation Partnership Project; Technical Specification Group Services and System Aspects; System Architecture for the 5G System; Stage 2", 3GPP Standard, Apr. 1, 2019.
Nokia, et al., "5G URLLC Optimizing Redundancy", 3GPP Draft, Apr. 10, 2019.
Catt, "Discussion on Higher Layer Multi-Connectivity ", 3GPP Draft, Apr. 6, 2019.
"Study on enhancement of Ultra-Reliable Low-Latency Communication (URLLC) support in the 5G Core network", 3GPP TR 23.725 , Mar. 25, 2019.
Samsung, "Supporting two NG-U tunnels for a single PDU Session", 3GPP TSG-RAN WG3 #103bis, Mar. 29, 2019.
European Patent Office, EP20796435.4 Extended European Search Report issued on Nov. 30, 2022.
WIPO, International Search Report issued on Jun. 20, 2020.
"Study on enhancement of Ultra-Reliable Low-Latency Communication (URLLC) support in the 5G Core network", 3GPP Technical Specification Services and System aspects, issued on Mar. 25, 2019.
Samsung, "Supporting two NG-U tunnels for a single PDU Session", 3GPP, issued on Mar. 29, 2019.

\* cited by examiner

METHOD AND DEVICE FOR CONFIGURING REDUNDANT PROTOCOL DATA UNIT SESSION

The present application is a National Stage of International Application No. PCT/CN2020/082591, filed on Mar. 31, 2020, which claims priority to Chinese Patent Application No. 201910346241.4 filed on Apr. 26, 2019, in Chinese Patent Office, both of which are incorporated by reference herein in their entireties.

TECHNICAL FIELD

The invention relates to the field of communication, in particular to a method and a device for configuring a redundant protocol data unit (PDU) session.

BACKGROUND

A mobile communication system includes a mobile user equipment (UE) and a network device (network) including a radio access network (RAN) and a core network (CN). The RAN includes one or more cell group, one or more base station, or one or more Node B. In a 5G system, the CN refers to a 5G core network (5G Core) including an access and mobility management function (AMF), a user plane function (UPF), a system management function (SMF), and the like.

In a dual-connectivity system, the UE establishes two or more connections with the network device. As shown in FIG. 1, the CN (which is a UPF network element of the core network) establishes connections with two cell groups of the RAN respectively, and the RAN includes a master node (MN) and a secondary node (SN).

A redundant user plane path scheme based on the dual-connectivity is proposed in Solution 1 of 3GPP TR23.725 which is a research report of 5G application scenarios. Details can be seen in descriptions for the 3GPP protocol, as shown in FIG. 2.

The UE initiates establishments of two redundant sessions (i.e., redundant PDU sessions) and configures a different combination of data network name (DNN) and single network slice selection assistance information (S-NSSAI) for each session, as shown in FIG. 3. The present invention is directed to a redundant session, and therefore, in the present invention, the redundant session is also referred to as a session for short, that is, a PDU session in the present invention refers to a redundant PDU session.

The SMF makes a decision whether the session can be established. The SMF makes the decision based on a combination of the S-NSSA, the DNN, a user authorization, a local policy configuration and the like. The SMF decides to use a redundant sequence number (RSN) to distinguish a PDU session which uses the MN (master NG-RAN) to send user plane data and a PDU session which uses the SN to send user plane data. In the present invention, configuring the PDU session on the MN (or the SN) means that user data of the PDU session is sent on the MN or the SN. As shown in FIG. 3, a user plane of one PDU session is established on a UPF1, and a user plane of another PDU session is established on a UPF 2.

The prior art has not provided any technical solution about how to realize connections among multiple user planes, and therefore the present invention provides a technical solution of realizing establishment and modification of the connections among the multiple user planes.

SUMMARY

Embodiments of the present invention provide a method and a configuration device for configuring a redundant PDU session, which at least solve a problem that how to realize connections of a plurality of user planes in the related art.

According to an embodiment of the present invention, provided is a method for configuring a redundant PDU session, including: obtaining first redundancy indication information for establishing or modifying a PDU session and/or a quality of service (QoS) flow; and configuring the redundant PDU session and/or a redundant QoS flow on a corresponding RAN node, according to the first redundancy indication information.

The first redundancy indication information is redundancy indication information of a PDU session level, or the first redundancy indication information is redundancy indication information of a QoS flow level.

The first redundancy indication information includes at least one of indicating whether the PDU session and/or the QoS flow is the redundant PDU session and/or the redundant QoS flow; and indicating the redundant PDU session and/or the redundant QoS flow to be configured on the corresponding RAN node.

Obtaining the first redundancy indication information for establishing or modifying the PDU session and/or the QoS flow, includes: obtaining, by a RAN master node, the first redundancy indication information for establishing or modifying the PDU session and/or the QoS flow from a core network.

Configuring the redundant PDU session and/or the redundant QoS flow on the corresponding RAN node, includes: configuring the redundant PDU session and/or the redundant QoS flow on the RAN master node, or configuring the redundant PDU session and/or the redundant QoS flow on a RAN secondary node.

Obtaining the first redundancy indication information for establishing or modifying the PDU session and/or the QoS flow, includes: obtaining, by a target RAN master node, the first redundancy indication information for establishing the PDU session and/or the QoS flow from a source RAN master node.

Configuring the redundant PDU session and/or the redundant QoS flow on the corresponding RAN node, includes: configuring the redundant PDU session and/or the redundant QoS flow on the target RAN master node, or configuring the redundant PDU session and/or the redundant QoS flow on a target RAN secondary node.

Before configuring the redundant PDU session and/or the redundant QoS flow on the RAN secondary node, the method further includes: sending, by the RAN master node, second redundancy indication information for establishing or modifying the PDU session and/or the QoS flow to the RAN secondary node.

The second redundancy indication information is redundancy indication information of a PDU session level, or the second redundancy indication information is redundancy indication information of a QoS flow level.

The second redundancy indication information is set to indicate whether the PDU session and/or the QoS flow is the redundant PDU session and/or the redundant QoS flow.

In response to the PDU session being newly established, before obtaining the first redundancy indication information for establishing or modifying the PDU session and/or the QoS flow, the method further includes: receiving, by a core network, a request for establishing a plurality of PDU sessions initiated by a UE, wherein each PDU session carries redundancy indication information of a PDU session level or a QoS level; and determining, by the core network, to establish the plurality of PDU sessions, and sending a PDU session establishment request message carrying the redundancy indication information of the PDU session level or the QoS level to a RAN master node.

All QoS flows of one redundant PDU session are redundant QoS flows, a type of the one PDU session is a non-split PDU session, and bearers corresponding to the all QoS flows contained in the one PDU session are configured on a same RAN node.

Configuring the redundant PDU session and/or the redundant QoS flow on the RAN node means that both an upper layer and a lower layer of a bearer corresponding to the redundant PDU session and/or the redundant QoS flow are configured on the RAN node.

When the redundant PDU session and/or the redundant QoS flow are/is configured on a RAN master node, a type of a corresponding bearer is a master node terminated master cell group (MCG) bearer.

When the redundant PDU session and/or the redundant QoS flow is configured on a RAN secondary node, a type of a corresponding bearer is secondary node terminated secondary cell group (SCG) bearer.

According to another embodiment of the present invention, provided is a device for configuring a redundant PDU session, including: an obtaining module configured to obtain first redundancy indication information for establishing or modifying a PDU session and/or a QoS flow; and a configuring module configured to configure the redundant PDU session and/or a redundant QoS flow on a corresponding RAN node, according to the first redundancy indication information.

The first redundancy indication information is redundancy indication information of a PDU session level, or the first redundancy indication information is redundancy indication information of a QoS flow level.

The first redundancy indication information includes at least one of: indicating whether the PDU session and/or the QoS flow is the redundant PDU session and/or the redundant QoS flow; and indicating the redundant PDU session and/or the redundant QoS flow to be configured on the corresponding RAN node.

The obtaining module includes a first obtaining unit configured to obtain, from a core network through a RAN master node, the first redundancy indication information for establishing or modifying the PDU session and/or the QoS flow.

The configuring module includes a first configuring unit configured to configure the redundant PDU session and/or the redundant QoS flow on the RAN master node, or configure the redundant PDU session and/or the redundant QoS flow on a RAN secondary node.

The obtaining module includes a second obtaining unit configured to obtain the first redundancy indication information for establishing the PDU session and/or the QoS flow from a source RAN master node through a target RAN master node.

The configuring module includes a second configuring unit configured to configure the redundant PDU session and/or the redundant QoS flow on the target RAN master node, or configure the redundant PDU session and/or the redundant QoS flow on a target RAN secondary node.

The device further includes a sending module configured to send second redundancy indication information for establishing or modifying the PDU session and/or the QoS flow to the RAN secondary node through the RAN master node, before configuring the redundant PDU session and/or the redundant QoS flow on the RAN secondary node.

The second redundancy indication information is redundancy indication information of a PDU session level, or the second redundancy indication information is redundancy indication information of a QoS flow level.

The second redundancy indication information is used for indicating whether the PDU session and/or the QoS flow is the redundant PDU session and/or the redundant QoS flow.

According to another embodiment of the present invention, further provided is a storage medium having a computer program stored thereon, wherein the computer program is configured to perform a step in the above-described method embodiments, when is executed.

According to another embodiment of the present invention, further provided is an electronic apparatus, including a memory having a computer program stored therein and a processor configured to execute the computer program to perform a step in the above-described method embodiments.

In the above embodiments of the present invention, the establishing and modifying of user plane multi-connectivity can be implemented by obtaining the redundancy indication information for establishing or modifying the PDU session and/or the QoS flow, and configuring the redundant PDU session and/or the QoS flow to the corresponding RAN node according to the redundancy indication information.

BRIEF DESCRIPTION OF THE DRAWINGS

The accompanying drawings are included herein to provide a further understanding of the present invention and constitute a part of the present application. Exemplary embodiments of the present invention and descriptions thereof are provided to explain the present invention and do not constitute a limitation of the present invention. In the accompanying drawings.

DETAILED DESCRIPTION

The present invention will be described in detail hereinafter with reference to the accompanying drawings and embodiments. It should be noted that, in the present application, the embodiments and features of the embodiments may be combined with each other without conflict.

It should be noted that terms "first", "second", and the like used in the description and claims of the present invention and in the accompanying drawings described above are used for distinguishing between similar elements and not necessarily for describing a particular sequential or a chronological order.

Figure 1:
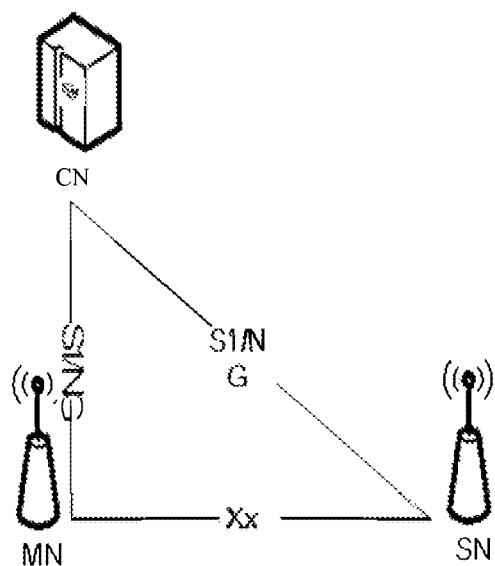
FIG. 1 is a schematic diagram of a dual-connectivity network architecture according to the related art.
Figure 2:
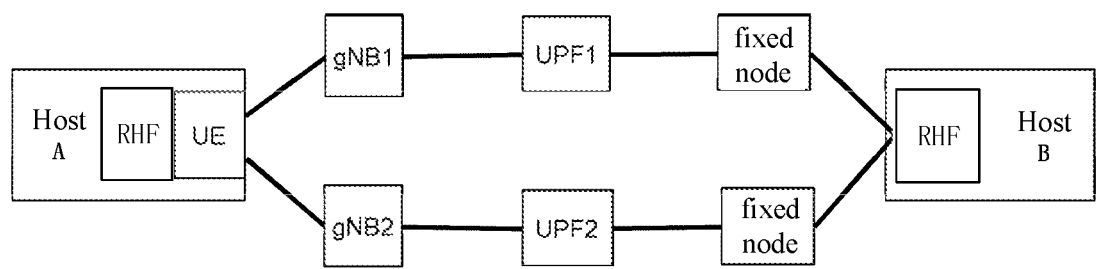
FIG. 2 is a schematic diagram of a single-device high-level architecture according to the related art.
Figure 3:
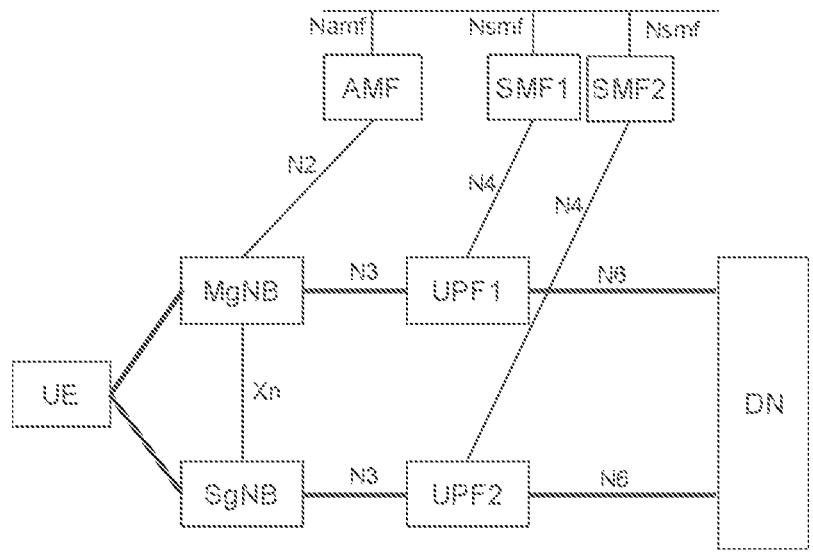
FIG. 3 is a schematic diagram of a solution architecture according to the related art.
Figure 4:
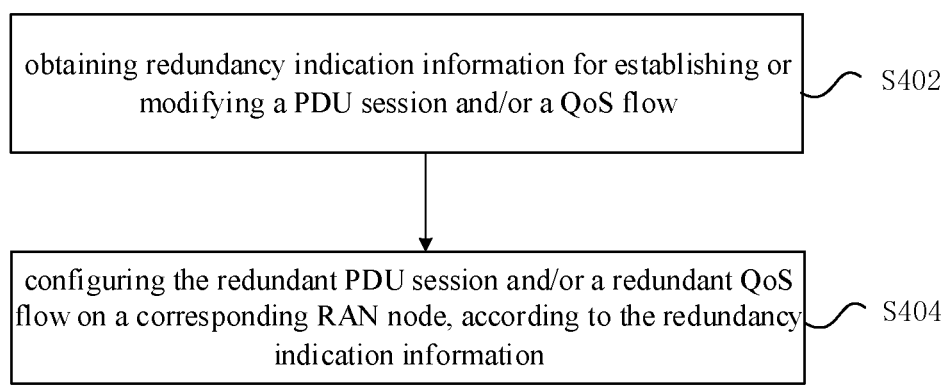
FIG. 4 is a flowchart of a method for configuring a redundant PDU session according to an embodiment of the present invention.

In an embodiment, a method for configuring a redundant PDU session is provided. FIG. 1 is a flowchart according to an embodiment of the present invention, and as shown in FIG. 4, the flowchart includes the following steps.

In step S402, redundancy indication information for establishing or modifying a PDU session and/or a QoS flow is obtained.

In step S404, a redundant PDU session and/or a redundant QoS flow is configured on a corresponding RAN node according to the redundancy indication information.

In the above step S402, a RAN master node (MN) obtains the redundancy indication information of the PDU session and/or the QoS flow to be established or modified from a CN. In a handover scenario, a target RAN MN obtains the redundancy indication information of the PDU session to be established and/or the redundancy indication information of the QoS flow to be established from a Source MN, separately.

In the above embodiment, the redundancy indication information may be a PDU session level or a QoS flow level, may indicate whether the PDU session and/or the QoS flow is the redundant PDU session and/or the redundant QoS flow, and may also indicate that the redundant PDU session and/or the redundant QoS flow is configured on a certain RAN node.

In the above step S404, when the redundancy indication information indicates that the redundant PDU session and/or the redundant QoS flow is configured on a SN, the MN sends new redundancy indication information to the SN. The redundancy indication information may be the PDU session level or the QoS flow level, and is used for indicating whether the PDU session and/or the QoS flow is the redundant PDU session and/or the redundant QoS flow.

In the above embodiment, all QoS flows of the redundant PDU session are redundant QoS flows, and the MN does not allow the PDU session to be split (which means that a type of the PDU session is a non-split PDU session, and all bearers corresponding to all the QoS flows contained in the PDU session must be configured on a same RAN node).

In the above embodiment, configuring the redundant PDU session and/or the redundant QoS flow on the RAN node means that a higher layer (including a service data adaptation protocol (SDAP), and a packet data convergence protocol (PDCP)) and a lower layer (including a radio link control (RLC), a media access control (MAC), and a physical layer) of its corresponding bearer are configured on the RAN node.

In the above embodiment, when the redundant PDU session and/or the redundant QoS flow is configured on the MN, a corresponding bearer type is a MN terminated MCG bearer, and when the redundant PDU session and/or the redundant QoS flow is configured on the SN, a corresponding bearer type is a SN terminated SCG bearer.

In the above embodiment, if the PDU session is newly established, before the above step S404, the method further includes the following steps.

In step 1, a UE initiates a request of establishing two PDU sessions (here, dual-connectivity is taken as an example, and a request of establishing a plurality of PDU sessions is also available) to a network, and each PDU session carries redundancy indication information of a PDU session level or a QoS level.

In step 2, the CN decides to establish the two PDU sessions, and sends a PDU session establishing request message which carries the redundancy indication information of the PDU session level or the QoS level, to the RAN MN.

Different application scenarios are specifically described below through embodiments.

Embodiment 1

Figure 5:
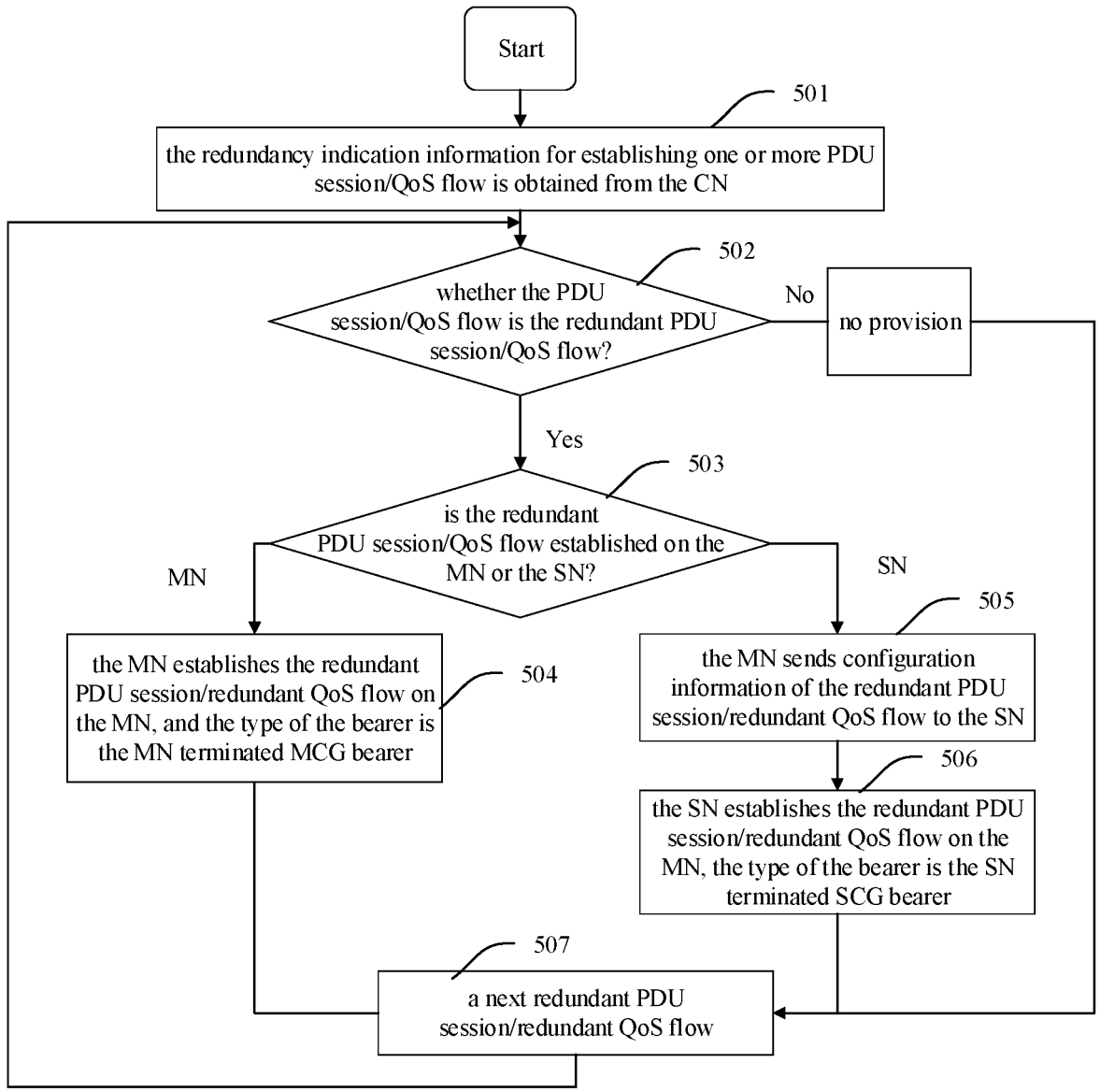
FIG. 5 is a flowchart of establishing a redundant PDU session/redundant QoS flow according to an embodiment of the present invention.

The present embodiment specifically describes a process of a RAN establishing the redundant PDU session and/or the redundant QoS flow. As shown in FIG. 5, the process includes the following steps.

In step S501, the RAN receives a PDU session resource setup request message sent by a CN (which is referred to an AMF in a 5G system, and a mobility management entity (MME) in a 4G system). The message contains one or more PDU sessions requested to be established, and each PDU session includes one or more QoS flows. The one or more PDU sessions in the PDU sessions contain a redundancy indication of a PDU session level, and/or the one or more PDU sessions in the PDU sessions contain a redundancy indication of the QoS flow level.

In the present embodiment, when a certain PDU session contains the redundancy indication information of the PDU session level, it means that this PDU session is a redundant PDU session, and at this time, all QoS flows included in this PDU session are redundant QoS flows.

In the present embodiment, when a certain PDU session contains the redundancy indication information of the QoS flow level, it means that the one or more QoS flows of the PDU session are redundant QoS flows, and at this time, each QoS flow containing the redundancy indication information is a redundant QoS flow.

In step S502, the RAN determines whether the PDU session/QoS flow is the redundant PDU session/QoS flow. If a result of the determination is negative, no provision is made in the present embodiment, and step S507 is directly executed. If the result of the determination is positive, step S503 is executed.

In the present embodiment, when a certain PDU session contains the redundancy indication information of the PDU session level, the PDU session is the redundant PDU session, all the QoS flows included in the PDU session are the redundant QoS flows, and at this time, the PDU session does not include the redundancy indication information of the QoS flow level.

In the present embodiment, the redundancy indication information may be of the PDU session level or the QoS flow level. The CN configures the redundancy indication information of the PDU session level and/or the QoS flow level and sends the redundancy indication information to the RAN. The RAN thus can know which PDU session(s) is (are) the redundant PDU session and which QoS flow(s) is (are) the redundant QoS flow.

In step S503, whether the redundant PDU session/QoS flow is established on the MN or the SN is further determined. If the redundant PDU session/QoS flow is established on the MN, step S504 is executed, and if the redundant PDU session/QoS flow is established on the SN, step S505 is executed.

In the present embodiment, the redundancy indication information has different values which can be identified by using RSNs indicating that corresponding PDU sessions or corresponding QoS flows need to be configured on different nodes of the RAN. When the RAN has dual-connectivity nodes, one of which is the MN and the other is the SN, RSN=0 may indicate that the redundant PDU session/QoS flow needs to be configured on the MN, and RSN=1 may indicate that the redundant PDU session/QoS flow needs to be configured on the SN. When the RAN has multi-connectivity nodes, one of which is node 0 (i.e., the MN), one of which is node 1 (i.e., a SN 1), one of which is node 2 (i.e., a SN 2), and one of which is node 3 (i.e., a SN 3), RSN=0 indicates that the redundant PDU session/QoS flow needs to be configured on the MN, RSN=1 indicates that the redundant PDU session/QoS flow needs to be configured on the SN 1, RSN=2 indicates that the redundant PDU session/QoS flow needs to be configured on the SN 2, and RSN=3 indicates that the redundant PDU session/QoS flow needs to be configured on the SN 3.

In the present embodiment, when a certain PDU session is the redundant PDU session, all QoS flows included the PDU session are the redundant QoS flows. The RAN configures the PDU session as a non-split PDU session according to the redundancy indication information of the redundant PDU session. That is, the RAN does not allow the QoS flows of the PDU session to be configured on different RAN nodes, but rather configures all the QoS flows of the PDU session on one RAN node.

In the present embodiment, when a certain QoS flow is the redundant QoS flow, the RAN configures the QoS flow on a certain RAN node according to the redundancy indication information of the redundant QoS flow.

In the present embodiment, when a plurality of redundant QoS flows belong to the same PDU session, the redundant QoS flows are configured with the same redundancy indication information (that is, the RSN values are the same, and the redundant QoS flows are all configured on the same RAN node). On the other hand, in order to support configuration flexibility of the redundant QoS flows, the present invention also allows the redundant QoS flows to be configured with different pieces of redundancy indication information (namely, the RSN values are different, and the redundant QoS flows are allowed to be configured on different RAN nodes).

In the present embodiment, the RAN reads the request message, if a certain PDU session/QoS flow has the redundancy indication information, the PDU session/QoS flow is the redundant PDU session/QoS flow, and then, the RAN can know that the PDU session/QoS flow is configured on a certain node according to the value of the redundancy indication information.

In the present embodiment, configuring all QoS flows of a certain redundant PDU session or a certain redundant QoS flow on a certain RAN node means that both a upper layer (including a SDAP, and a PDCP) and a lower layer (including a RLC, a MAC, and a physical layer) of a bearer corresponding to the QoS flow are configured on the RAN node. For the redundant PDU session, which may contain a plurality of QoS flows, the QoS flows may be configured on one or more bearers, and then both the higher and lower layers of the bearers must be configured on the same RAN node.

In step S504, the redundant PDU session/QoS flow is established on the MN, and the type of the bearer is the MN terminated MCG bearer.

In a 5G multi-connectivity system (i.e., a multi-radio access technology (RAT) dual connectivity (MR-DC) with 5GC) of 3GPP Rel-15, one RAN node is the MN and the other RAN node is the SN. If RSN=0 indicates that the redundant PDU session or the redundant QoS flow needs to be configured on the MN, the corresponding bearer must be the MN terminated MCG bearer. RSN=1 indicates that the redundant PDU session or the redundant QoS flow needs to be configured on the SN, and the corresponding bearer must be the SN terminated SCG bearer.

In step S505, when the redundancy indication information of the redundant PDU session and/or the redundant QoS flow requires that the redundant PDU session and/or the redundant QoS flow to be configured on the SN, the MN sends a SN addition request message or a SN modification request message to the SN. An information element (IE) 'PDU Session Setup Info-SN terminated' in the message includes the redundancy indication information of one or more redundant PDU sessions and/or one or more redundant QoS flows requested to be established and other related configuration information.

The redundancy indication information sent by the MN to the SN may be the PDU session level or the QoS flow level.

The redundancy indication information sent by the MN to the SN for a certain redundant PDU session or redundant QoS flow may be different from the redundancy indication information received from the CN.

On one hand, through reading from the CN whether a certain PDU session/QoS flow is configured with the redundancy indication information, the RAN can know whether the PDU session/QoS flow is the redundant PDU session/QoS flow, and on the other hand, through reading the value of the redundancy indication information of the certain PDU session/QoS flow, the RAN can know which RAN node the PDU session/QoS flow needs to be configured on.

In the request message of the step S505, if a certain PDU session/QoS flow is configured redundancy indication information, the PDU session/QoS flow is the redundant PDU session/QoS flow and must be configured on the SN. Thus, the redundancy indication information sent from the MN to the SN may only indicate whether the certain PDU session/QoS flow is the redundant PDU session/QoS flow.

In step S506, the SN receives the SN addition request message or the SN modification request message sent by the MN, the redundancy indication information contained in the message indicates that the redundant PDU session and/or the redundant QoS flow to be configured on the SN. The SN configures the type of the corresponding bearer as the SN terminated SCG bearer, and the SN does not allow the type of the bearer to be changed until the redundancy indication information indicates to be changed.

The redundancy indication information of the redundant PDU session and/or the redundant QoS flow in the message is important because the SN is likely to configure the bearer of the PDU session/QoS flow as a SN terminated split bearer or a SN terminated MCG bearer without the redundancy indication information.

In step S507, the above steps are repeated for a next received PDU session/redundant QoS flow.

Embodiment 2

The present embodiment describes a process of the RAN modifying the redundant PDU session and/or the redundant QoS flow.

For a certain PDU session configured as the redundant PDU session, the 5GC may configure the PDU session as the redundant PDU session when the PDU session is established. The 5GC may also configure the PDU session as a normal PDU session (i.e. a non-redundant PDU session)

when the PDU session is established, and then modify the PDU session into the redundant PDU session. The 5GC may also modify a certain redundant PDU session into the normal PDU session (i.e., the non-redundant PDU session).

For a certain QoS flow configured as the redundant QoS flow, the 5GC may configure the QoS flow as the redundant QoS flow when the QoS flow is established. The 5GC may also configure the QoS flow as a normal QoS flow (i.e., a non-redundant QoS flow) when the QoS flow is established, and then modify the QoS flow into the redundant QoS flow. The 5GC may also modify a certain redundant QoS flow into the normal QoS flow (i.e., the non-redundant QoS flow).

Figure 6:
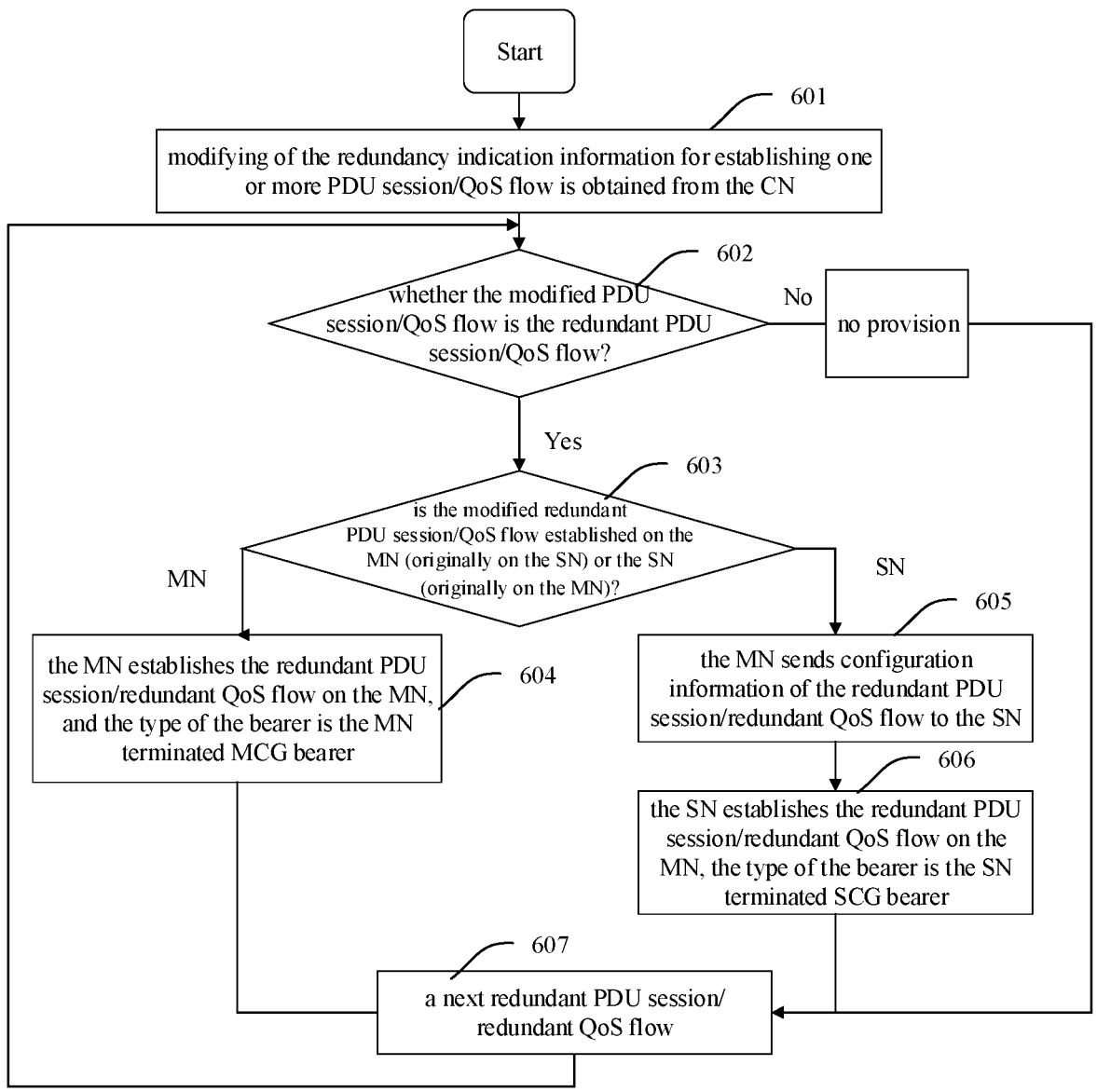
FIG. 6 is a flowchart of modifying a redundant PDU session/redundant QoS flow according to an embodiment of the present invention.

As shown in FIG. 6, a method flowchart of the present embodiment includes the following steps.

In step S601, the RAN receives a PDU session resource modification request message sent by the CN. The message indicates whether there is the redundancy indication information for modifying one or more PDU sessions or not, and/or whether to modify the value of the redundancy indication information of the one or more QoS flows or not.

Modifying the redundancy indication information of the PDU session, or modifying the redundancy indication information of the QoS flow, includes: modifying a certain redundant PDU session or a certain redundant QoS flow into the non-redundant PDU session or the non-redundant QoS flow (namely, the PDU session or the QoS flow is not configured with the redundancy indication information), or modifying a certain non-redundant PDU session or a certain non-redundant QoS flow into the redundant PDU session or the redundant QoS flow (namely, the PDU session or the QoS flow is configured with the redundancy indication information), or modifying the value of the redundancy indication information of the certain redundant PDU session or the certain redundant QoS flow (for example, modifying the value of the RSN from 0 to 1, or modifying the value of the RSN from 0 to 1, namely, the redundant PDU session or the redundant QoS flow is reconfigured from one RAN node to another RAN node).

In step S602, the RAN determines whether the modified PDU session/QoS flow is the redundant PDU session/QoS flow or not. If a result of the determination is negative, the step S607 is executed directly without provision in the embodiment. If the result of the determination is positive, step S603 is executed.

In step S603, whether the modified redundant PDU session/QoS flow is established on the MN or the SN is further determined. If it is established on the MN, step S604 is executed, and if it is established on the SN, step S605 is executed.

In the present embodiment, the RAN performs corresponding configuration according to whether there is the redundancy indication information after each PDU session and/or each QoS flow is modified, or a value of new redundancy indication information after modified.

A new redundant PDU session and/or a new redundant QoS flow is configured on the RAN node indicated by the redundancy indication information, or an existing redundant PDU session and/or an existing QoS flow is configured on a new RAN node indicated by the modified redundancy indication information, and the RAN may or may not modify configuration of the non-redundant PDU session and/or the non-redundant QoS flow modified from the redundant PDU session and/or the redundant QoS flow.

In step S604, the redundant PDU session/QoS flow is established on the MN, and the type of the bearer is the MN terminated MCG bearer.

In step S605, when the redundancy indication information of the redundant PDU session and/or the redundant QoS flow requires that the redundant PDU session and/or the redundant QoS flow to be configured on the SN, the MN sends the SN modification request message to the SN, and the IE 'PDU session Resource Modification Info-SN terminated' in the message includes modifying an existence of the redundancy indication information of one or more PDU sessions.

In step S606, the SN receives the SN modification request message sent by the MN and performs corresponding configuration.

For a PDU session and/or a QoS flow newly configured with the redundancy indication information, the SN configures the PDU session and/or the QoS flow as the SN terminated SCG bearer; and for the PDU session or the QoS flow which is originally the redundant PDU session or redundant QoS flow but is not configured with the redundancy indication information at present, the PDU session or QoS flow not configured with the redundancy indication information is the non-redundant PDU session or non-redundant QoS flow, and the SN may or may not reconfigure it.

In step S607, the above steps are repeated for a next received PDU session/redundant QoS flow.

Embodiment 3

The present embodiment describes a process of a source RAN node transmitting the redundant PDU session and/or the redundant QoS flow to a target RAN node in a handover process.

Due to mobility of the UE, or fluctuation of a base station signal, at least three types of handovers may be triggered: a SN handover without MN change, a MN handover without SN change, and a MN handover with SN change, refer to 3GPP TS 37.340 for details.

A source NG-RAN node (a source MN) transmits redundancy indication information of each PDU session and/or each QoS flow from the source node (the source NG-RAN) to a target node (a target NG-RAN), and the redundancy indication information is transmitted through an NG interface if the handover is based on the NG interface, or through an Xn interface if the handover is based on the Xn interface.

Figure 7:
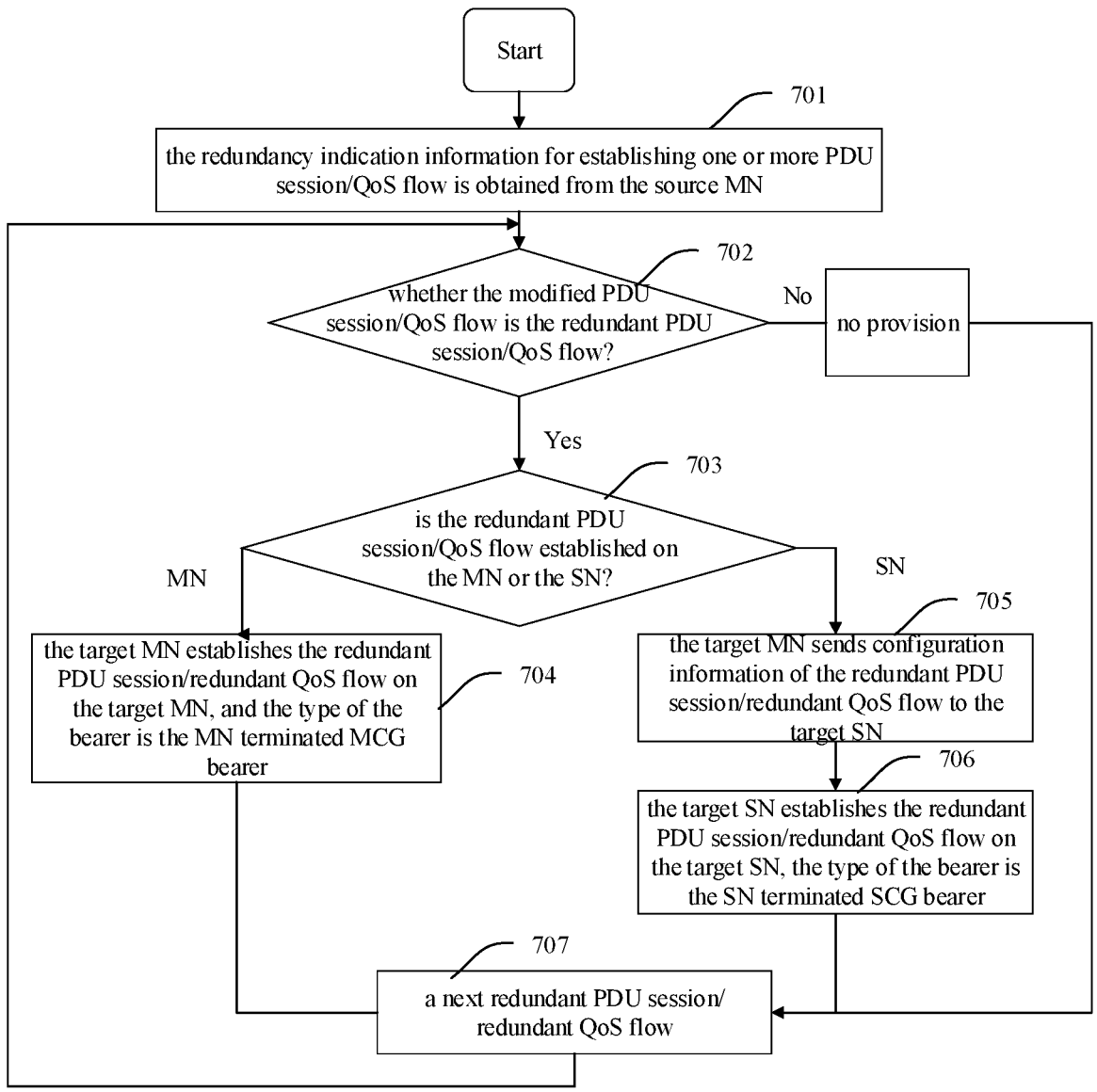
FIG. 7 is a flowchart of establishing a redundant PDU session/redundant QoS flow in a handover scenario according to an embodiment of the present invention.

As shown in FIG. 7, the process of the embodiment includes the following steps.

In step S701, in a handover request message sent by the source RAN node to the target RAN node, each redundant PDU session and/or each redundant QoS flow includes redundancy indication information.

Compared with the embodiment 1, in the present embodiment, the redundancy indication information of each PDU session and/or each QoS flow is sent from the source RAN node to the target RAN node. The redundancy indication information is sent through the handover request message.

For the MR-DC with 5GC system, the source RAN node is the source MN, and the target RAN node is the target MN. That is, the handover request message is sent from the source MN to the target MN.

In step S702, the RAN determines whether the PDU session/QoS flow is the redundant PDU session/QoS flow. If a result of the determination is negative, step S707 is directly executed without provision in the embodiment. If the result of the determination is positive, step S703 is executed.

In step S703, whether the redundant PDU session/QoS flow is established on the MN or the SN is further determined. If it is established on the MN, step S704 is executed, and if it is established on the SN, step S705 is executed.

The target MN configures the redundant PDU session and/or the redundant QoS flow on a corresponding RAN target MN or target SN according to the redundancy indication information of each redundant PDU session and/or each redundant QoS flow.

Compared to the embodiment 1, the target MN in the embodiment is similar to the RAN in the embodiment 1.

In the step S704, the redundant PDU session/redundant QoS flow is established on the MN, and the type of the bearer is the MN terminated MCG bearer.

In step S705, when the redundancy indication information of the redundant PDU session and/or the redundant QoS flow requires the redundant PDU session and/or the redundant QoS flow to be configured on the target SN, the target MN sends the SN addition request message to the target SN, and an IE 'PDU session Resource Setup Info-SN terminated' in the message contains the redundancy indication information of one or more redundant PDU sessions and/or one or more redundant QoS flow requested to be established and other relevant configuration information.

Compared with the embodiment 1, in the present embodiment, the target MN replaces the MN, the target SN replaces the SN, and the message does not include the SN modification request message. The others are the same.

The redundancy indication information sent by the MN to the SN may be the PDU session level or QoS flow level.

For a certain redundant PDU session or redundant QoS flow, the redundancy indication information sent by the target MN to the target SN may be different from the redundancy indication information received from the source MN.

On one hand, by reading whether a certain PDU session/QoS flow from the source MN is configured with the redundancy indication information, the target MN can know whether the PDU session/QoS flow is the redundant PDU session/redundant QoS flow, and on the other hand, by reading the value of the redundancy indication information of the certain PDU session/QoS flow, the target MN can know which target RAN node the PDU session/QoS flow needs to be configured on.

In the request message of the step S705, if a certain PDU session/QoS flow is configured with the redundancy indication information, the certain PDU session/QoS flow is the redundant PDU session/redundant QoS flow and must be configured on the SN. Therefore, the redundancy indication information sent from the MN to the SN may indicate only whether the certain PDU session/QoS flow is the redundant PDU session/redundant QoS flow.

In step S706: the target SN receives the SN addition request message or the SN modification request message sent by the target MN, and the redundancy indication information included in the message indicates that the redundant PDU session and/or the redundant QoS flow is configured on the SN, then the SN configures a type of a corresponding bearer as the SN terminated SCG bearer, and the SN does not allow to change the type of the bearer until the redundancy indication information indicates to be changed. The process of modifying the redundancy indication information may refer to the embodiment 2.

The redundancy indication information of the redundant PDU session and/or the redundant QoS flow in the message is important because the SN is likely to configure the bearer of the PDU session/QoS flow as the SN terminated split bearer or the SN terminated MCG bearer without the redundancy indication information.

In step S707: the above steps are repeated for a next received PDU session/redundant QoS flow.

Embodiment 4

In the present embodiment, the UE initiates a request for establishing a redundant PDU session or initiates a request for establishing part redundant QoS flows in the PDU session.

In the present embodiment, a preset condition is that the UE has a capability of establishing dual-connectivity, and the UE has already established the dual-connectivity with the network, or the UE has known that it can establish the dual-connectivity with the current network. For convenience of description, in the present embodiment, the dual-connectivity is only taken as an example, and multi-connectivity which is more than the dual-connectivity is also available.

Figure 8:
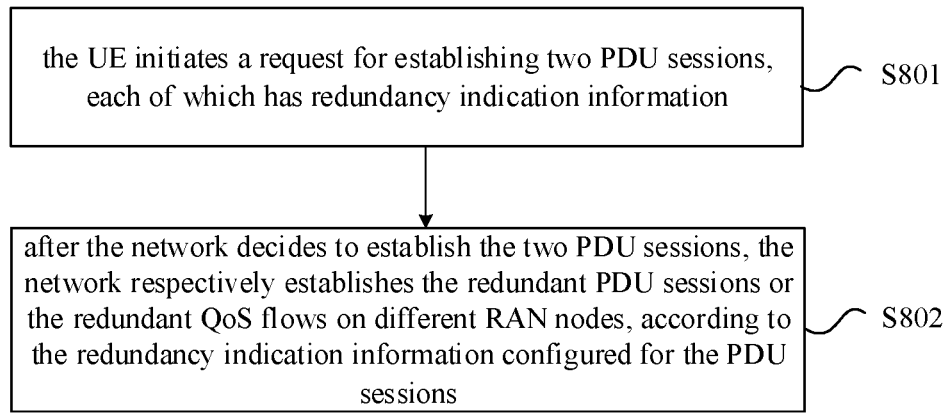
FIG. 8 is a flowchart of initiating an establishment of a redundant PDU session/redundant QoS flow according to an embodiment of the present invention.

As shown in FIG. 8, the process of the embodiment includes the following steps.

In step S801, the UE initiates a request for establishing two PDU sessions (i.e., a PDU session establishment request message) to the network, the two PDU sessions each has the redundancy indication information and can also include other configuration information (such as DNN and/or S-NS-SAI).

The redundancy indication information may be of the PDU session level or QoS flow level. When the redundancy indication information is of the PDU session level, all QoS flows contained in the two PDU sessions are the redundant QoS flows. When the redundancy indication information is of the QoS flow level, part of the QoS flows contained in the two PDU sessions are the redundant QoS flows and the others are the non-redundant QoS flows.

In step S802, after the network decides to establish the two PDU sessions, the network respectively establishes the redundant PDU sessions or the redundant QoS flows on different RAN nodes according to the redundancy indication information configured for the PDU sessions.

The network reads the redundancy indication information in the PDU session establishment request message, and can obtain a mutual redundancy relationship of the two PDU sessions.

When the redundancy indication information is of the PDU session level, the network respectively establishes the 2 PDU sessions on different RAN nodes, and the type of each PDU session is a non-split PDU session type. In a dual-connectivity network, the types of the bearers of all QoS flows of one PDU session are MN terminated MCG bearers, and the types of the bearers for all QoS flows of the other PDU session are SN terminated SCG bearers.

When the redundancy indication information is of the QoS flow level, the network respectively establishes the redundant QoS flows on different RAN nodes, and the type of each PDU session can be a split PDU session type. In the dual-connectivity network, the types of the bearers for the redundant QoS flows of one PDU session are the MN terminated MCG bearers, and the types of the bearers for the redundant QoS flows of the other PDU session are the SN terminated SCG bearers.

Through the description of the foregoing embodiments, it is clear to those having ordinary skill in the art that the method according to the foregoing embodiments may be implemented by software with a necessary general hardware platform, and certainly may also be implemented by hardware, but the former is a better implementation mode in many cases. Based on such understanding, the technical solutions of the present invention or portions thereof contributing to the prior art may be embodied in a form of a software product, which is stored in a storage medium (such as a ROM/RAM, a magnetic disk, or an optical disk) and includes instructions for enabling a terminal device (which may be a mobile phone, a computer, a server, or a network device) to execute the method according to the embodiments of the present invention.

In an embodiment, a device for configuring a redundant PDU session is further provided, and the device is used for implementing the foregoing embodiments and preferred embodiments, and details of which have been already described are not repeated. As used below, the terms "module" and "unit" may implement a combination of software and/or hardware of predetermined functions. Although the device described in the embodiment below is preferably implemented in software, an implementation in hardware or a combination of software and hardware is also possible and contemplated.

Figure 9:
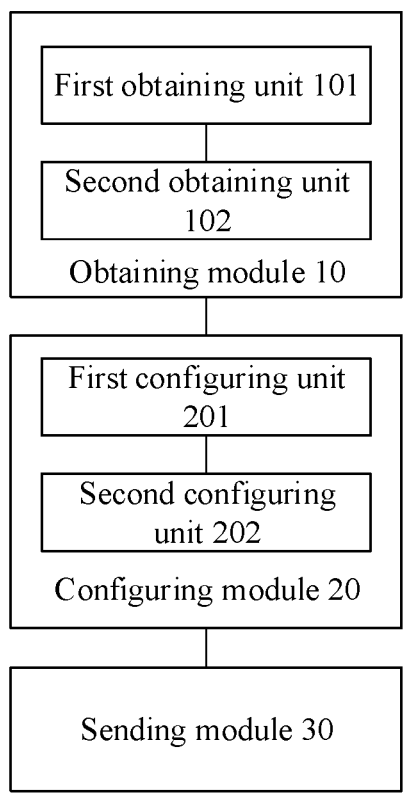
FIG. 9 is a schematic structural diagram of a configuration of a redundant PDU session according to an embodiment of the present invention.

FIG. 9 is a block diagram of a device for configuring a redundant PDU session according to an embodiment of the present invention. As shown in FIG. 9, the device includes an obtaining module 10 and a configuring module 20.

The obtaining module 10 is configured to obtain first redundancy indication information for establishing or modifying a PDU session and/or QoS flow. The configuring module 20 is configured to configure the redundant PDU session and/or a redundant QoS flow on a corresponding RAN node, according to the first redundancy indication information.

The first redundancy indication information is redundancy indication information of a PDU session level, or the first redundancy indication information is redundancy indication information of a QoS flow level, and used for indicating whether the PDU session and/or QoS flow is the redundant PDU session and/or the redundant QoS flow, or used for indicating that the redundant PDU session and/or redundant QoS flow is configured on a corresponding RAN node.

In the above embodiment, the obtaining module 10 may further include a first obtaining unit 101. The first obtaining unit 101 is configured to obtain the first redundancy indication information for establishing or modifying the PDU session and/or QoS flow from a CN via a RAN MN.

In the above embodiment, the configuring module 20 may further include a first configuring unit 201. The first configuring unit 201 is configured to configure the redundant PDU session and/or the redundant QoS flow on the RAN MN or to configure the redundant PDU session and/or the redundant QoS flow on a RAN SN.

In the above embodiment, the obtaining module 10 may further include a second obtaining unit 102. The second obtaining unit 102 is configured to obtain, from a source RAN MN, the first redundancy indication information for establishing the PDU session and/or the QoS flow through a target RAN MN.

In the above embodiment, the configuring module 20 may further include a second configuring unit 202. The second configuring unit 202 is configured to configure the redundant PDU session and/or the redundant QoS flow on the target RAN MN, or configure the redundant PDU session and/or the redundant QoS flow on the target RAN SN.

In the above embodiment, the device for configuring the redundant PDU session may further include a sending module 30. The sending module 30 is configured to send second redundancy indication information for establishing or modifying the PDU session and/or QoS flow to the RAN SN via the RAN MN, before configuring the redundant PDU session and/or the redundant QoS flow on the RAN SN.

The second redundancy indication information is the redundancy indication information of the PDU session level, or the second redundancy indication information is redundancy indication information of a QoS flow level, and used for indicating whether the PDU session and/or the QoS flow is the redundant PDU session and/or the redundant QoS flow.

An embodiment of the present invention further provides a storage medium having a computer program stored therein. The computer program is configured to perform the steps in the above method embodiments when executed.

Optionally, in the embodiment, the storage medium may include but is not limited to various media capable of storing the computer program, such as a USB disk, a Read-Only Memory (ROM), a Random Access Memory (RAM), a removable hard disk, a magnetic disk, or an optical disk.

An embodiment of the present invention further provides an electronic apparatus including a memory in which a computer program is stored and a processor configured to execute the computer program to perform the steps in any of the above method embodiments.

Optionally, the electronic apparatus may further include a transmission apparatus and an input/output apparatus. The transmission apparatus is connected to the processor, and the input/output apparatus is connected to the processor.

It will be apparent to those having skill in the art that the modules or steps of the present invention described above may be implemented by a general purpose computing device, and may be centralized in a single computing device or distributed across a network consisted of multiple computing devices, and alternatively, may be implemented by a program code executable by the computing device, such that they may be stored in a memory device and executed by the computing device. In some cases, the steps shown or described may be executed out of order. The modules or steps are separately made as individual integrated circuit modules, or a part of them may be implemented as a single integrated circuit module. Thus, the present invention is not limited to any specific combination of hardware and software.

The above description is only a preferred embodiment of the present invention and is not intended to limit the present invention, and various modifications and changes may be made by those having skill in the art. Any modification, equivalent replacement, or improvement made within the principle of the present invention shall be included in the protection scope of the present invention.

The invention claimed is:

1. A method for configuring a redundant protocol data unit (PDU) session, comprising:
    obtaining first redundancy indication information for establishing or modifying a PDU session and/or a quality of service (QOS) flow; and
    configuring the redundant PDU session and/or a redundant QoS flow on a corresponding radio access network (RAN) node, according to the first redundancy indication information,
    wherein configuring the redundant PDU session and/or the redundant QoS flow on the corresponding RAN node comprises:
        configuring the redundant PDU session and/or the redundant QoS flow on a RAN secondary node;
        before configuring the redundant PDU session and/or the redundant QoS flow on the RAN secondary node, further comprising:

sending, by the RAN master node, second redundancy indication information for establishing or modifying the PDU session and/or the QoS flow to the RAN secondary node,
wherein the first redundancy indication information is different from the second redundancy indication information.

2. The method of claim 1, wherein the first redundancy indication information is redundancy indication information of a PDU session level, or the first redundancy indication information is redundancy indication information of a QoS flow level.

3. The method of claim 2, wherein the first redundancy indication information comprises at least one of:
  indicating whether the PDU session and/or the QoS flow is the redundant PDU session and/or the redundant QoS flow, and
  indicating the redundant PDU session and/or the redundant QoS flow to be configured on the corresponding RAN node.

4. The method of claim 1, wherein obtaining the first redundancy indication information for establishing or modifying the PDU session and/or the QoS flow comprises:
  obtaining, by a RAN master node, the first redundancy indication information for establishing or modifying the PDU session and/or the QoS flow from a core network.

5. The method of claim 1, wherein obtaining the first redundancy indication information for establishing or modifying the PDU session and/or the QoS flow comprises:
  obtaining, by a target RAN master node, the first redundancy indication information for establishing the PDU session and/or the QoS flow from a source RAN master node.

6. The method of claim 5, wherein configuring the redundant PDU session and/or the redundant QoS flow on the corresponding RAN node comprises:
  configuring the redundant PDU session and/or the redundant QoS flow on the target RAN master node, or configuring the redundant PDU session and/or the redundant QoS flow on a target RAN secondary node.

7. The method of claim 6, before configuring the redundant PDU session and/or the redundant QoS flow on the RAN secondary node, further comprising:
  sending, by the RAN master node, second redundancy indication information for establishing or modifying the PDU session and/or the QoS flow to the RAN secondary node.

8. The method of claim 7, wherein the second redundancy indication information is redundancy indication information of a PDU session level, or the second redundancy indication information is redundancy indication information of a QoS flow level.

9. The method of claim 8, wherein the second redundancy indication information is set to indicate whether the PDU session and/or the QoS flow is the redundant PDU session and/or the redundant QoS flow.

10. The method of claim 1, wherein the second redundancy indication information is redundancy indication information of a PDU session level, or the second redundancy indication information is redundancy indication information of a QoS flow level.

11. The method of claim 10, wherein the second redundancy indication information is set to indicate whether the PDU session and/or the QoS flow is the redundant PDU session and/or the redundant QoS flow.

12. The method of claim 1, wherein, in response to the PDU session being newly established, before obtaining the first redundancy indication information for establishing or modifying the PDU session and/or the QOS flow, the method further comprises:
  receiving, by a core network, a request for establishing a plurality of PDU sessions initiated by a user equipment (UE), wherein each PDU session carries redundancy indication information of a PDU session level or a QoS level; and
  determining, by the core network, to establish the plurality of PDU sessions, and sending a PDU session establishment request message carrying the redundancy indication information of the PDU session level or the QoS level to a RAN master node.

13. The method of claim 1, wherein all QoS flows of one redundant PDU session are redundant QoS flows, a type of the one PDU session is a non-split PDU session, and bearers corresponding to the all QoS flows contained in the one PDU session are configured on a same RAN node.

14. The method of claim 1, wherein configuring the redundant PDU session and/or the redundant QoS flow on the RAN node means that both an upper layer and a lower layer of a bearer corresponding to the redundant PDU session and/or the redundant QoS flow are configured on the RAN node.

15. The method of claim 1, wherein a type of a corresponding bearer is a master node (MN) terminated master cell group (MCG) bearer, in response to the redundant PDU session and/or the redundant QoS flow being configured on a RAN master node.

16. The method of claim 1, wherein a type of a corresponding bearer is a secondary node (SN) terminated secondary cell group (SCG) bearer, in response to the redundant PDU session and/or the redundant QoS flow being configured on a RAN secondary node.

17. A non-transitory computer-readable storage medium having a computer program stored thereon, wherein the computer program is configured to perform the method of claim 1, when is executed.

18. An electronic apparatus comprising a memory having a computer program stored therein and a processor configured to execute the computer program to perform the method of claim 1.

* * * * *